(12) United States Patent
Luss (10) Patent No.: US 7,801,177 B2
(45) Date of Patent: *Sep. 21, 2010

(54) METHOD FOR EQUITABLE BANDWIDTH ALLOCATION FOR CONTENT DISTRIBUTION NETWORKS

(75) Inventor: Hanan Luss, Marlboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/036,346

(22) Filed: Feb. 25, 2008

(65) Prior Publication Data

US 2009/0213875 A1 Aug. 27, 2009

(51) Int. Cl.
*H04J 3/16* (2006.01)
*H04J 3/22* (2006.01)
(52) U.S. Cl. ........................ 370/468; 370/252
(58) Field of Classification Search ................. 370/230, 370/252, 468
See application file for complete search history.

(56) References Cited

U.S. PATENT DOCUMENTS

| | | | |
|---|---|---|---|
| 5,917,822 | A | 6/1999 | Lyles et al. |
| 6,986,156 | B1 * | 1/2006 | Rodriguez et al. ............. 725/95 |
| 2006/0153100 | A1 * | 7/2006 | Dube et al. ................. 370/256 |
| 2007/0104222 | A1 | 5/2007 | Luss |

OTHER PUBLICATIONS

International Search Report, dated Apr. 23, 2009.
Li, B., Liu, J. Multirate Video Multicast over the Internet: An Overview. IEEE Network, Jan./Feb. 2003.
Hua, K., Tantaoui, M., Tavanapong, W. Video Delivery Technologies for Large-Scale Deployment of Multimedia Applications. IEEE Sep. 2004.
Lee, C., Moon, Y., Cho., Y. A lexicographically fair allocation of discrete bandwidth for multirate multicast traffics. Computers and Operations Research, 2004.
Lee, C., Cho, H., Discrete bandwidth allocation considering fairness and transmission load in multicast networks. Mar. 2006.
Luss, Hanan. An Equitable Bandwidth Allocation Model for Video-On-Demand Networks. Dec. 2007.
Luss, Hanan. On the equitable resource allocation problems: A lexicographic minimax approach. Operations Research, May/Jun. 1999.

(Continued)

*Primary Examiner*—Ricky Ngo
*Assistant Examiner*—David Oveissi
(74) *Attorney, Agent, or Firm*—Philip J. Feig (57) ABSTRACT

A method is presented for determining bandwidth allocations in a content distribution network that comprises multiple trees, where the root of each tree has a server that broadcasts multiple programs throughout the tree. Each network link has limited capacity and may be used by one or more of these trees. The allocation problem is formulated as an equitable resource allocation problem with a lexicographic maximin objective function that attempts to provide equitable service performance for all requested programs at the various nodes. The constraints include link capacity constraints and tree-like ordering constraints imposed on each of the programs. The algorithm provides an equitable solution in polynomial time for wide classes of performance functions. At each iteration, the algorithm solves single-link maximin optimization problems while relaxing the ordering constraints, selects a bottleneck link and fixes various variables at their optimal value.

12 Claims, 2 Drawing Sheets

OTHER PUBLICATIONS

Betts, L., Brown, J., Luss., H. Minimax Resource Allocation Problems with Ordering Constraints. Naval Research Logistics, vol. 41. pp. 719-738 (1994).

Klein, R., Luss, H., Smith, D., A lexicographic minimax algorithm for multiperiod resource allocation Mathematical Programming 55 (1992).

* cited by examiner

METHOD FOR EQUITABLE BANDWIDTH ALLOCATION FOR CONTENT DISTRIBUTION NETWORKS

FIELD OF THE INVENTION

The present invention relates to content distribution networks. Specifically, the invention relates to the allocation of available bandwidth for content distribution from multiple servers and more specifically, the invention concerns bandwidth allocation on each of the links in a network comprised of multiple trees among multiple programs requested at the nodes of the network.

BACKGROUND OF THE INVENTION

Many telecommunications network services providers, cable TV operators, and telecommunications equipment providers are showing significant interest in provisioning content distribution services such as Video-on-Demand (VOD). Primary application areas include on-demand home entertainment, remote learning and training, video conferencing, and news-on-demand. These services are expected to grow significantly over time and become an important source of income for the service providers. However, in order to provide adequate service, significant bandwidth resources must be available, which implies large capital investments. For example, in near-VOD applications a server may broadcast a copy of a popular movie every five minutes, which implies that a customer may wait, on average, 2.5 minutes. Thus, if the length of the movie is 100 minutes, the network would carry simultaneously 20 copies of the movie, which would require significant bandwidth resources.

Numerous papers discuss content distribution delivery technologies that are expected to be practical for large-scale problems. These include the papers by B. Li and J. Liu, "Multirate Video Multicast Over the Internet: An Overview", *IEEE Network,* 17, 24-29, January/February 2003, and by K. A. Hua, M. A. Tantaoui, and W. Tavanapong, "Video Delivery Technologies for Large-Scale Deployment of Multimedia Applications", *Proceedings of the IEEE,* 92, 1439-1451, September 2004. Nevertheless, even with effective delivery technologies, the bandwidth requirements would be large, and an effective method of allocating the available bandwidth resources is needed.

A service provider may install servers at strategic nodes of the network and assign various program families at each of these servers. A program family is an aggregation of similar programs; for example, children's movies may be represented by one family. The term "program" will be understood to include program families. Each server broadcasts (more precisely, multicasts) its programs on a tree network. Trees associated with different servers may have joint links. Each link in the network has limited bandwidth capacity, and each node in the network has demand for a subset of the programs. The objective is to allocate the available bandwidth on all the links among the programs carried on these links in an optimal way that provides equitable service to all requested programs at all nodes. The service provided to any of the nodes requesting a specific program is specified through a performance function that represents satisfaction from the quality provided which, in turn, depends on the allocated bandwidth. The problem of finding an equitable bandwidth allocation is formulated as a lexicographic maximin optimization problem.

Current state-of-the-art systems use ad-hoc heuristics and communications network managers' experience for VOD bandwidth allocation. Some optimization-based methods for the simultaneous optimal allocation of bandwidth on all links of the content distribution network have been published. C. Y. Lee, Y. P. Moon, and Y. J. Cho, "A Lexicographically Fair Allocation of Discrete Bandwidth for Multirate Multicast Traffics", *Computers and Operations Research,* 31, 2349-2363, 2004 and C. Y. Lee and H. K. Cho, "Discrete Bandwidth Allocation Considering Fairness and Transmission load in Multicast Networks", *Computers and Operations Research,* 34, 884-899, 2007 present related models that approximate an equitable service objective through the minimization of the sum of convex decreasing functions and use heuristic methods, specifically, tabu search and genetic algorithm heuristics, to solve the model with the approximate objective. H. Luss, "Bandwidth Allocation for Video-on-Demand Networks", U.S. patent application Ser. No. 11/268,105, filed on Nov. 7, 2005 (hereafter referred to as the '105 application) provides an optimization algorithm to the lexicographic maximin optimization problem; however, the method uses a bisection search which implies that the required computational effort is not polynomial as it depends on a specified desired accuracy parameter. The method is also described in the paper by H. Luss, "An Equitable Bandwidth Allocation Model for Video-on-Demand Networks", *Networks and Spatial Economics,* 8, 23-41, 2008. The current invention provides a new method for finding the equitable solution where the computational effort of the new method is polynomial for wide classes of performance functions.

SUMMARY OF THE INVENTION

The present invention provides a method for optimal allocation of bandwidth available on each link of a network comprised of multiple trees, where the root of each tree has a server that broadcasts multiple programs throughout the tree. Each of the programs may be stored and broadcasted from one or more of the servers. Each network link may be used by one or more of these trees. The links have limited capacity; hence, prudent bandwidth allocation decisions must be made for each program on each of the relevant links. The bandwidth allocation problem is formulated as an equitable resource allocation problem with a lexicographic maximin objective function that attempts to provide equitable service performance for all requested programs at the various nodes. The constraints include link capacity constraints and tree-like ordering constraints imposed on each of the programs. The ordering constraints ensure that the bandwidth allocated to a specific program on a link cannot exceed the bandwidth allocated to that program on the preceding link of the tree that carries the program to these links.

The '105 application provides an algorithm to solve the equitable allocation problem using a bisection search which implies that the required computational effort is not polynomial as it depends on a specified desired accuracy parameter. The current invention provides a new method for finding the equitable solution that is polynomial for wide classes of performance functions. At each iteration, the algorithm solves single-link maximin optimization problems while relaxing the tree-like ordering constraints. The algorithm selects a bottleneck link and fixes all variables associated with the bottleneck link at their lexicographic maximin value. The algorithm also fixes selected variables on other links at their lexicographic maximin value while enforcing the ordering constraints. In addition to determining optimal bandwidth allocations, the algorithm provides an ordered list of links from the most critical link to the least critical link, a useful feature for capacity expansion planning decisions. The algorithm can be used to solve bandwidth allocation on large-scale networks. Since new programs are periodically introduced into the network while other programs are removed from the network, repeated execution of the algorithm could be used to determine effective assignment of new programs to servers.

H. Luss in his paper "On Equitable Resource Allocation Problems: A Lexicographic Minimax approach", *Operations Research* 47, 361-378, 1999 presents an exposition of equitable resource allocation models and algorithms. L. M. Betts, J. R. Brown, and H. Luss, "Minimax Resource Allocation for Problems with Ordering Constraints", *Naval Research Logistics* 41, 719-738, 1994 present an equitable resource allocation method that can handle simple ordering constraints, but not tree-like ordering constraints needed for the invention. R. S. Klein, H. Luss, and D. R. Smith, "A Lexicographic Minimax Algorithm for Multiperiod Resource Allocation", *Mathematical Programming* 55, 213-234, 1992 solve a special case of the model in Betts, Brown, and Luss referenced above, intended for multi-period resource allocation problems. The model solved by the present invention is significantly more complex and its solution requires a new, innovative method to solve the equitable allocation problem with tree-like ordering constraints in polynomial computational effort.

The present invention will be more clearly understood when the following description is read in conjunction with the accompanying drawings.

DETAILED DESCRIPTION

Figure 1:
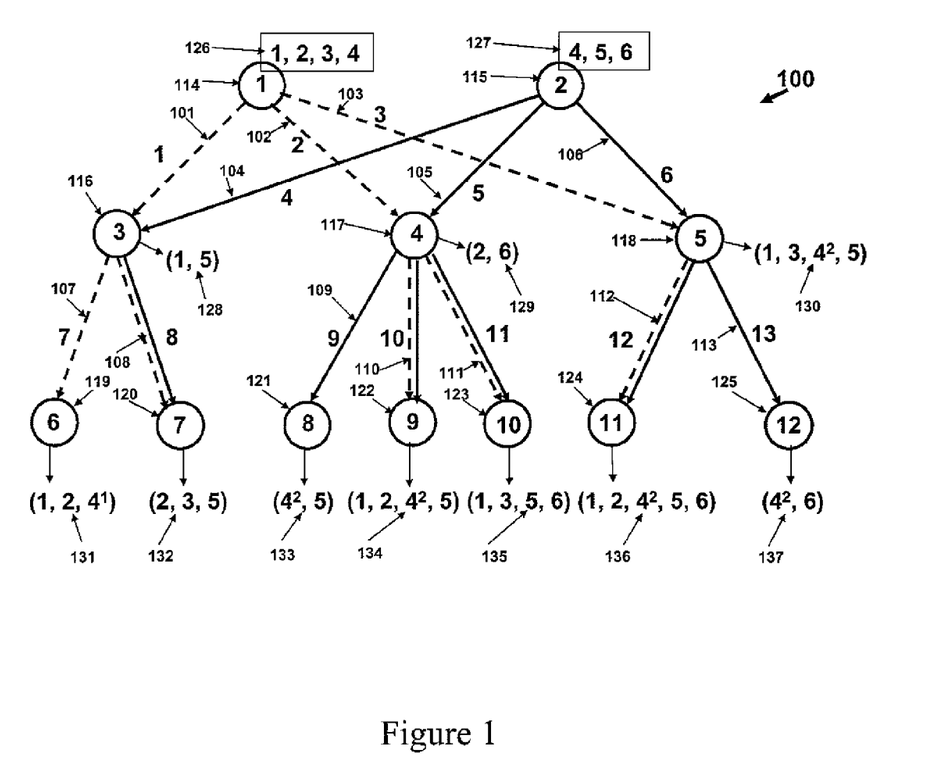
FIG. 1 illustrates the bandwidth allocation problem for a content distribution network comprised of multiple trees with a server at the root of each tree broadcasting multiple programs.

Referring now to the figures and to FIG. 1 in particular, there is shown an example of a content distribution network 100. The network consists of directed links 101-113, also referred to as links 1-13, respectively, and of nodes 114-125, also referred to as nodes 1-12, respectively. Server 1 is installed at node 1 with programs 1, 2, 3 and 4, as shown by 126. Server 2 is installed at node 2 with programs 4, 5 and 6, as shown by 127. Each of these servers may broadcast programs along a specified tree of directed links. The tree used by server 1, referred to as tree 1, includes the links with dashed lines; i.e., links 1, 2, 3, 7, 8, 10, 11 and 12. The tree used by the server at node 2, referred to as tree 2, includes the links with solid lines; i.e., links 4, 5, 6, 8, 9, 10, 11, 12 and 13. Note that links 8, 10, 11 and 12 are included in both trees. The programs requested at each of the nodes are specified by 128-137; for example, as specified by 130, node 5 has demands for programs 1, 3, 4 and 5. Since program 4 is stored in both servers, a superscript indicates the server that broadcasts program 4 to that node. Each of the programs stored at a server may be broadcasted on only a subset of the links of the corresponding tree. For example, program 3, stored at server 1, is routed only on links 1, 2, 3, 8 and 11 since program 3 is not requested at nodes 6, 9 and 11.

Note that there is no advantage to carrying program 4 on more than one link from among all incoming links into any of the nodes. Hence, since program 4 at node 5 is served by server 2, it should be carried on link 6 but not on link 3. This also implies that program 4 should be served at nodes 11 and 12 by server 2 and that program 4 should be served at nodes 8 and 9 by the same server (in our example, server 2). Suppose program 4 is served at node 8 from server 1 and at node 9 from server 2. Then, program 4 is carried on both links 2 and 5, whereas if program 4 is served at nodes 8 and 9 from the same server it will be carried on only one of these links. Also, there is no advantage to carrying a program on any link incoming into a node if this node has a server that broadcasts that program. For instance, suppose program 4 is broadcasted from an added server at node 4 (not shown in FIG. 1); then, program 4 should not be carried on links 2 and 5. Note that the programs carried on each link are uniquely determined from the information of the broadcasting trees, the programs requested at the nodes and the supplying server for each of these programs at these nodes. As illustrated above, some of the supplying server information can be inferred.

Each link has a limited bandwidth capacity. Furthermore, the bandwidth allocated to a given program on a link cannot exceed the bandwidth allocated to that program on its predecessor link of the corresponding tree. For example, the bandwidth allocated to program 5 on any of the links 9, 10 or 11 cannot exceed the bandwidth allocated to program 5 on link 5. Thus, in addition to the link capacity constraints, the problem has tree-like ordering constraints for each of the programs. The ordering constraints need to be satisfied independently of the specific delivery technology. For example, for near-VOD, the time intervals between broadcasting copies of a program may be increased in successive nodes along the tree, which would translate to decreased bandwidth requirements. However, these time intervals may not be decreased in successive nodes along the tree. For other technologies with almost instantaneous VOD delivery, the video quality of a program may be decreased (but not increased) in successive nodes due to decreased bandwidth allocated to that program.

Consider a network comprised of a set of nodes N and a set of interconnecting directed links A. Servers may be placed at some of the nodes, where each server stores multiple programs. Each of these servers broadcasts the programs on a tree network using a subset of the links in A, and each of the links may be used by multiple trees.

The input parameters are:

The Network n=Index for nodes in the network; n∈ N.

a=Index for directed links in the network; a∈ A.

$c_a$=Bandwidth capacity available for content distribution on link a.

Content Distribution s=Index for servers; s∈ S, where S is the set of servers.

$n_s$=The node where server s is installed; s∈ S. In FIG. 1, server 1 is installed at node 1 and server 2 is installed at node 2.

$T_s(N_s, A_s)$=Broadcasting tree for server s. The tree includes a subset of nodes $N_s \subseteq N$ and a subset of links $A_s \subseteq A$. For example, in FIG. 1, the tree for server 1 at node 1 consists of set of nodes $N_1 = \{1, 3, 4, 5, 6, 7, 9, 10, 11\}$ and of set of links $A_1 = \{1, 2, 3, 7, 8, 10, 11, 12\}$.

p=Index for programs; p∈ P, where P is the set of programs.

$P_s$=Set of programs stored at server s. In FIG. 1, $P_1 = \{1, 2, 3, 4\}$ and $P_2 = \{4, 5, 6\}$. Note that program 4 is stored in both servers.

$D_n$=Set of programs requested at node n. For example, in FIG. 1, $D_{10} = \{1, 3, 5, 6\}$.

$D_{n,s}$=Set of programs requested at node n served by server. In FIG. 1, $D_{5,1} = \{1, 3\}$ and $D_{5,2} = \{4, 5\}$.

The broadcasting trees $T_s(N_s, A_s)$ and the sets of programs $D_{n,s}$ imply unique routing of programs from servers to other nodes which, in turn, implies the programs carried on each of the links ae A.

Although not required by our model and algorithm, some routing assumptions are introduced. In particular, for any program p and node n, it is assumed that: (i) Program p is routed into node n from at most one server. In other words, any program p is carried on at most one incoming link into node n from among all incoming links into n; and (ii) If node n has a sever that broadcasts program p, none of the incoming links into node n carries program p. These assumptions prevent inefficient use of bandwidth. They also allow simplification of the notation below.

The following notations are derived from the input and will be used in the model formulation:

$NP = \{(n, p) | p \in D_n, n \in N\}$; i.e., doubleton $(n, p) \in NP$ if program p is requested at node n.

$LP_a$ = Set of programs carried on link a. In FIG. 1, $LP_{10}\{1, 2, 4, 5\}$ where programs 1 and 2 are broadcasted from server 1 while programs 4 and 5 are broadcasted from server 2.

$LP = \{(a, p) | p \in LP_a, a \in A\}$; i.e., doubleton $(a, p) \in LP$ if program p is carried on link a. Note that by routing assumption (i) a doubleton $(a, p) \in LP$ implies the server s that routes program p onto link a.

$SUC(a)$ = Set of successor links of link a. For example, in FIG. 1, $SUC(5) = \{9, 10, 11\}$.

$T_{ap}$ = A subtree of $T_s(N_s, A_s)$ where server s routes program p on link a (server s is implied by (a, p) and routing assumption (i)). $T_{ap}$ has the head-node of link a as its root and starting from there, includes all links of $A_s$ that carry program p. For example, in FIG. 1, $T_{54}$ includes nodes 4, 8 and 9 and links 9 and 10.

$pre_{ap}$ = Predecessor link of link a that carries program p (this is of interest only if link a carries program p). In FIG. 1, $pre_{94} = 5$. Again, by routing assumption (i), $pre_{ap}$ is uniquely implied from (a, p).

Decision Variables and Performance Functions $x_{ap}$ = Bandwidth allocated on link a for program p; $(a, p) \in LP$. x denotes the vector of decision variables $x_{ap}$ for all $(a, p) \in LP$ and $x_a$ denotes the vector of decision variables $x_{ap}$ for all (a, p) with $p \in LP_a$.

$B_p$ = Lower bound for bandwidth allocated for program p on all links for which $(a, p) \in LP$.

$F_{np}(x_{ap})$ = Performance function associated with $(n, p)$ $(n, p) \in NP$, where $x_{ap}$ is the bandwidth allocated to program p on the link that carries program p into node n. For example, at node 3 of FIG. 1, the performance functions are $F_{31}(x_{11})$ and $F_{35}(x_{45})$. A performance function represents the satisfaction of customers with bandwidth $x_{ap}$ for program p at node n. We assume that $F_{np}(x_{ap})$ is a continuous, strictly increasing function. We also assume that for any specific program p, $F_{np}(x_{ap})$ is the same for all nodes n; $(n, p) \in NP$.

The bandwidth allocation problem must satisfy various constraints. The total bandwidth allocated to all programs carried on each of the links cannot exceed the available bandwidth capacity, while the bandwidth allocated to each of the programs must satisfy the lower bound. In addition, the bandwidth allocated for any program p on link a must be at least as large as the bandwidth allocated to program p on all successor links of link a that carry program p. The latter constraints are expressed as tree-like ordering constraints.

The objective is to determine equitable bandwidth allocations for all $(n, p) \in NP$, while satisfying all the constraints. Consider the vector of all performance function values, $F_{np}(x_{ap})$, for all $(n, p) \in NP$, sorted in non-decreasing order. An equitable solution is defined as a solution that provides the lexicographic largest vector of these ordered performance function values.

Let $F^{(NP)}(x)$ be a vector of performance functions $F_{np}(x_{ap})$ for all $(n, p) \in NP$, where for a given vector x these performance functions are sorted in a non-decreasing order. Thus, $$F^{(NP)}(x) = [F_{n_1 p_1}(x_{a_1 p_1}), F_{n_2 p_2}(x_{a_2 p_2}), F_{n_3 p_3}(x_{a_3 p_3}), \ldots], \quad (1.1)$$

where $$F_{n_1 p_1}(x_{a_1 p_1}) \leq F_{n_2 p_2}(x_{a_2 p_2}) \leq F_{n_3 p_3}(x_{a_3 p_3}) \leq \quad (1.2)$$

An equitable solution is the lexicographic largest vector $F^{(NP)}(x)$ that satisfies all the constraints. The resulting problem is called a lexicographic maximin optimization problem. The lexicographic maximin solution extends the notion of a maximin solution as we are required to maximize not only the smallest performance function value, but also the second smallest one, the third smallest one, and so forth.

The Equitable Bandwidth Allocation Model (EBAM) is now formulated as a lexicographic maximin optimization problem.

Problem EBAM (2.1)

$$V^{LEX} = lex\max_x [F^{(NP)}(x)]$$

so that (1.1) and (1.2) are satisfied, and $$\sum_{p \in LP_a} x_{ap} \leq c_a, \text{ for all } a \in A \quad (2.2)$$

$$x_{ap} \geq x_{mp}, \text{ for all } m \in SUC(a) \text{ and } (m, p) \in LP, \quad (2.3)$$
$$\text{for all } (a, p) \in LP$$

$$x_{ap} \geq B_p, \text{ for all } (a, p) \in LP. \quad (2.4)$$

It is assumed that $\Sigma_{p \in LP_a} B_p \leq c_a$ for all $a \in A$ so that a feasible solution for Problem EBAM exists. Objective function (2.1) (with (1.1) and (1.2)) specifies the vector that provides the equitable solution. Constraints (2.2) enforce the bandwidth capacity constraint on each of the links. Constraints (2.3) enforce the ordering constraints. Suppose program p is carried on link a. The routing assumptions imply that the same server routes program p to link a and to all its successors that carry program p. Constraints (2.4) enforce lower bounds on bandwidth allocation. The optimal value of the decision variables are denoted by superscript L. Without the routing assumptions, formulation of Problem EBAM would require more involved notation, including extending the notation of the decision variables from $x_{ap}$ to $x_{aps}$.

The lexicographic maximin solution for Problem EBAM is unique. However, in related problems when the performance functions are not strictly increasing or when the decision variables are limited to discrete values, the lexicographic maximin solution may not be unique.

The '105 application presents an algorithm that solves Problem EBAM with a single server for performance functions that may be node-dependent. The performance functions are strictly decreasing, representing customers' dissatisfaction and the equitable solution is then the lexicographic minimax solution (this formulation can readily be converted to a lexicographic maximin optimization problem with strictly increasing performance functions). The algorithm repeatedly solves minimax optimization problems where each such problem considers all resource constraints and ordering constraints while employing a bisection search on the objective function value. The model and algorithm can readily be extended to the multiple-server model; however, the computational effort is not truly polynomial as it depends on a parameter that specifies desired accuracy of the bisection search.

Figure 2:
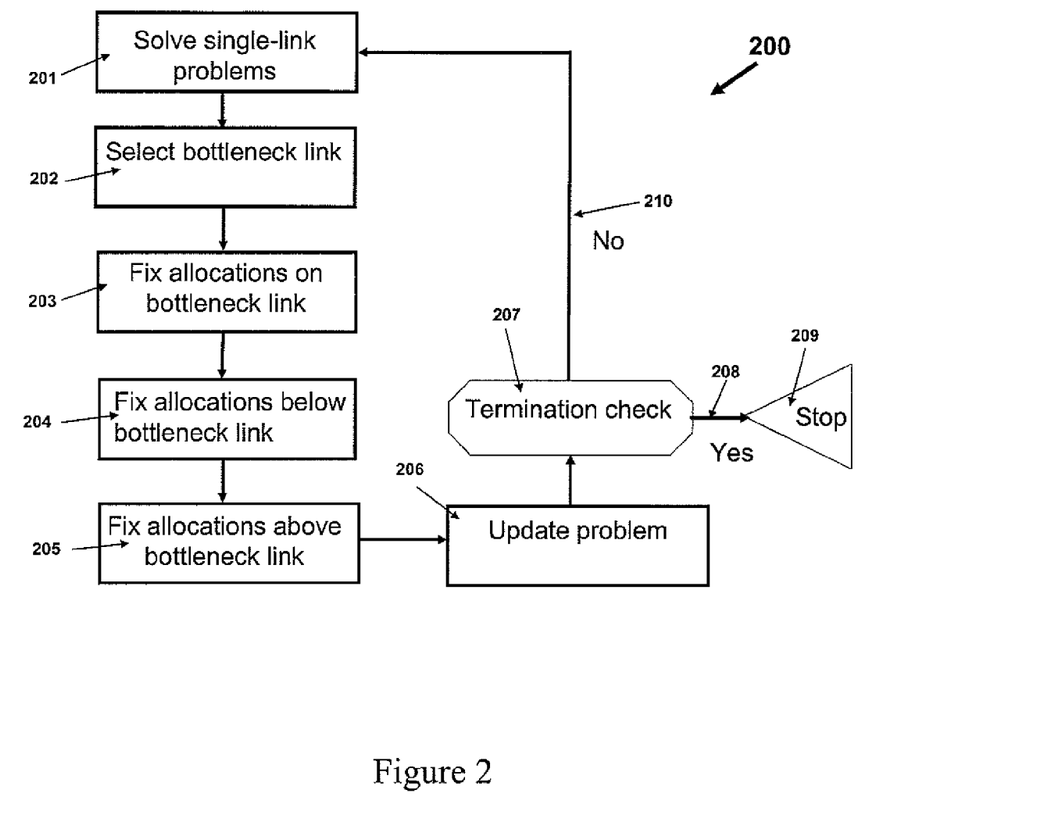
FIG. 2 is a flow chart of a method embodying the present invention that determines equitable bandwidth allocation in polynomial time for wide classes of performance functions for a content distribution network.

Referring now to FIG. 2, there is shown a flow chart 200 of an algorithm of the current invention that solves Problem EBAM for the typical situation where the performance functions for any specific program are the same at all nodes that request that program. For wide classes of performance functions the new algorithm is truly polynomial. The algorithm is referred to as Algorithm EBAM. Each of the algorithm steps is described below.

Algorithm EBAM

Solve Single-Link Problems 201

The proposed algorithm solves initially a bandwidth allocation problem, using a maximin objective function, for each link that carries some of the programs, while relaxing the ordering constraints. The formulation of the Single-Link Bandwidth Allocation Model for link a (Problem SLBAM-a) is as follows:

Problem $SLBAM\text{-}a$ (3.1)

$$V_a = \max_{x_a} \left[ \min_{p \in LP_a} F_p(x_{ap}) \right]$$

so that $$\sum_{p \in LP_a} x_{ap} \leq c_a \quad (3.2)$$

$$x_{ap} \geq B_p, \text{ for all } p \in LP_a. \quad (3.3)$$

Note that objective function (3.1) includes a performance function for every program p carried on link a regardless of where the demand for that program exists in the nodes of subtree $T_{ap}$. For example, the objective function of Problem SLBAM-6 in FIG. 1 considers programs 4-6 although program 6 is not requested at node 5. Since the performance function for program p is node-independent, we dropped the subscript n in (3.1). The optimal variable values are denoted by superscript *.

Consider now Problem SLBAM-a. H. Luss in his paper "On Equitable Resource Allocation Problems: A Lexicographic Minimax approach", *Operations Research* 47, 361-378, 1999 presents several algorithms for a more general problem with multiple knapsack resource constraint. For simplicity, all lower bounds in Problem SLBAM-a are assumed to be zero, which is readily achieved by a linear transformation of variable $x_{ap} \leftarrow x_{ap} - B_p$ for all $p \in LP_a$ and revising the capacity constraint to $c_a \leftarrow c_a - \Sigma_{p \in LP_a} B_p$. Two of these algorithms, adapted to solve Problem SLBAM-a where all lower bounds were already transformed to zero, are presented below.

The Activity Deletion Algorithm for Problem SLBAM-a

Step 1. Rearrange the variables so that $F_{p+1}(0) \leq F_p(0)$ for all $p \in LP_a$.
Let $J = LP_a$.
Step 2. Solve Problem SLBAM-a without the lower bounds for all $p \in J$. The maximin objective value $W_a$ of the relaxed problem with set of programs J is the solution of the equation $$\sum_{p \in J} F_p^{-1}(W_a) = c_a, \quad (4)$$

where $F_p^{-1}(W_a)$ is the inverse function of the performance function of program p.
Step 3. If $F_p(0) \leq W_a$ for all $p \in J$, STOP;
$V_a = W_a$ and $x_{ap}^* = \max[0, F_p^{-1}(W_a)]$
for $p \in LP_a$.
Step 4. Delete from J all variables for which $F_p(0) \geq W_a$ and return to Step 2.

The Activity Addition Algorithm for Problem SLBAM-a

Step 1. Rearrange the variables so that $F_{p+1}(0) \leq F_p(0)$ for all $p \in LP_a$.
Let $J = \{$largest index $p \in LP_a\}$.
Step 2. Solve Problem SLBAM-a without the lower bounds for all $p \in J$. The maximin objective value $W_a$ of the relaxed problem with set of programs J is the solution of the equation $$\sum_{p \in J} F_p^{-1}(W_a) = c_a, \quad (5)$$

where $F_p^{-1}(W_a)$ is the inverse function of the performance function of program p.
Step 3. If $J = LP_a$ or if $F_p(0) \geq W_a$ for the largest index $p \notin J$,
STOP; $V_a = W_a$ and $x_{ap}^* = \max[0, F_p^{-1}(W_a)]$ for $p \in LP_a$.
Step 4. Add to J the largest index $p \notin J$ and return to Step 2.

The algorithms above find the optimal solution in polynomial effort when $W_a$ in (4) or (5) can be derived as a closed-form expression. Such closed-form expressions can be derived for wide classes of performance functions that are appropriate for the content distribution application. A sample of such functions, their corresponding inverse functions and the closed-form expressions for $W_a$ are given in Table 1.

TABLE 1

Examples of Performance Functions with Closed-Form Expressions for $W_a$

| $F_p(x_{ap})$ for all $p \in J$ | $F_p^{-1}(W_a)$ | $W_a$ |
|---|---|---|
| $\alpha_p + \beta_p x_{ap}$ | $(W_a - \alpha_p)/\beta_p$ | $\left[ c_a + \sum_{p \in J}(\alpha_p/\beta_p) \right] / \sum_{p \in J}(1/\beta_p)$ |
| $\ln(\alpha_p + \beta_p x_{ap})$ | $(e^{W_a} - \alpha_p)/\beta_p$ | $\ln\left\{ \left[ c_a + \sum_{p \in J}(\alpha_p/\beta_p) \right] / \sum_{p \in J}(1/\beta_p) \right\}$ |
| $\alpha - \beta_p/[x_{ap} + B_p]$ | $\beta_p/(\alpha - W_a) - B_p$ | $\alpha - \left[ \sum_{p \in J} \beta_p \right] / \left[ c_a + \sum_{p \in J} B_p \right]$ |

In Table 1, all lower bounds are at zero as a result of a linear transformation of variable $x_{ap} \leftarrow x_{ap} - B_p$ for all $p \in LP_a$. Consider the first row. The original performance functions were simply linear, $F_p(x_{ap}) = \beta_p x_{ap}$. The entries above are after the linear transformation, where $\alpha_p = \beta_p B_p$. The performance function in the second row expresses diminishing marginal increase of satisfaction for larger bandwidth. The third performance function (before transformation of variables $F_p(x_{ap}) = \alpha - \beta_p/x_{ap}$) is taken from a near video-on demand application described in H. Luss, "An Equitable Bandwidth Allocation Model for Video-on-Demand Networks", *Net-*

*works and Spatial Economics*, 8, 23-41, 2008, where a copy of the content is repeatedly broadcasted, say, every five minutes ($\alpha$ is the ratio of upper bound to lower bound of bandwidth requirement and is assumed to be independent of p, and $\beta_p$ is the upper bound).

Consider the Activity Deletion Algorithm for solving Problem SLBAM-a. When $W_a$ is computed by a closed-form expression, most of the computational effort is spent on computing the expression for $W_a$ in an effort of $O(|LP_a|)$. Initially, at Step 2 the $|LP_a|$ terms in the summations (see Table 1) are computed. In subsequent iterations some of these terms are deleted from the summation terms. Computing the optimal values of all variables in Step 3 requires also an effort of $O(|LP_a|)$. Although the sorting in Step 1 requires a computational effort of $O(|LP_a|\log|LP_a|)$, this effort is small compared to that spent in step 2. The Activity Deletion Algorithm has the same computational complexity.

When $W_a$ cannot be derived as a closed-form expression, variations of the algorithms above can still be used to solve Problem SLBAM-a, but their computational effort is then not truly polynomial as they would require a numerical search. Although our algorithm for solving Problem EBAM can still be used, the resulting algorithm will not be polynomial and would require about the same effort as the algorithm in the '105 application.

Select Bottleneck Link 202

Select a bottleneck link, referred to as link $a_1$. Link $a_1$ is a bottleneck link if $V_{a_1} \leq V_a$ for all links $a \in A$ with $LP_a \neq \emptyset$.

The following proposition holds and provides the basis for computing the optimal solution by finding at each iteration a bottleneck link and fixing various variables at their lexicographic maximin value.

Proposition 1. Let the solution to Problem SLBAM-a for each link with $LP_a \neq \emptyset$ be given by the objective value $V_a$ and let the vector of decision variables be $x_a^*$. Suppose link $a_1$ is the selected bottleneck link (i.e., $V_{a_1} \leq V_a$ for all links with $LP_a \neq \emptyset$). Then:

(i) $x_{a_1 p}^L = x_{a_1 p}^*$ for all $p \in LP_{a_1}$;

(ii) Suppose program $p_1 \in LP_{a_1}$. Then, $x_{ap_1}^L = x_{a_1 p_1}^L$ for all $a \in T_{a_1 p_1}$; and (iii) Suppose program $p_1 \in LP_{a_1}$ and link $a_2$ is on the path of tree $T_s(N_s, A_s)$ that carries program $p_1$ from the root to link $a_1$. Then, if program $p_1$ is not requested at any of the nodes of $T_{a_2 p_1} \setminus T_{a_1 p_1}$, $x_{ap_1}^L = x_{a_1 p_1}^L$ for all links a associated with the path that carries program $p_1$ from link $a_2$ to link $a_1$ (including link $a_2$).

Fix Allocations on Bottleneck Link 203

Fix $x_{a_1 p}^L = x_{a_1 p}^*$ all $p \in LP_{a_1}$ where link $a_1$ is the selected bottleneck link. This step is justified by Part (i) of Proposition 1.

Fix Allocations Below Bottleneck Link 204

For each $p \in LP_{a_1}$ and $a \in T_{a_1 p}$ where link $a_1$ is the selected bottleneck link, fix $x_{ap}^L = x_{a_1 p}^L$ and update $c_a \leftarrow c_a - x_{ap}^L$. This step is justified by Part (ii) of Proposition 1.

Fix Allocations Above Bottleneck Link 205

For each $p \in LP_{a_1}$ where link $a_1$ is the selected bottleneck link:

(a) Let $a_{temp} = a_1$.

(b) If $a_{temp}$ is adjacent to the server that routes program p onto link $a_1$, go to Step (f).

(c) Let $a = pre_{a_{temp} p}$.

(d) If program p is requested at any of the nodes of $T_{ap} \setminus T_{a_1 p}$, go to Step (f); otherwise, fix $x_{ap}^L = x_{a_1 p}^L$ and update $c_a \leftarrow c_a - x_{ap}^L$.

(e) Let $a_{temp} = a$ and go to (b).

(f) Continue with the next $p \in LP_{a_1}$.

This step is justified by Part (iii) of proposition 1.

Update Problem 206

For each (a, p) that was fixed in Steps 203-205, delete (a, p) from LP and p from $LP_a$. Delete links whose set $LP_a = \emptyset$ from set A. This step updates the problem by deleting variables that were fixed and by deleting empty constraints. The remaining problem is in the same format as the original problem, but with fewer variables and fewer constraints. Solving repeatedly such problems and fixing variables at each iteration is justified by Proposition 2 below.

Proposition 2. Let i denote the iteration number in Algorithm EBAM and let $V_a(i)$ denote $V_a$ at iteration i. Suppose links $a_1$ and $a_2$ are the bottleneck links in iterations i and i+1 of Algorithm EBAM, respectively. Then $V_{a_2}(i+1) \geq V_{a_1}(i)$.

Termination Check 207-210

Check whether $A = \emptyset$ (step 207). If $A = \emptyset$ (208), stop (209); Problem EBAM is solved. If $A \neq \emptyset$ (210), return to the step 201 for another iteration. Note that after the first iteration, only single-link problems in which the set $LP_a$ changed from the previous iteration and the new set $LP_a \neq \emptyset$ are re-solved.

Upon termination, Algorithm EBAM provides the optimal solution of Problem EBAM. For clarity, a summary of the algorithm is provided below.

Algorithm EBAM (Summarized)

Step 201. Solve Problem SLBAM-a with set of programs $LP_a$ for each link $a \in A$ with $LP_a \neq \emptyset$. The optimal objective function value is $V_a$ and the optimal decision variable vector is $x_a^*$.

Step 202. Identify a bottleneck link, say link $a_1$; i.e., $V_{a_1} \leq V_a$ for all links $a \in A$ with $LP_a \neq \emptyset$.

Step 203. Fix $x_{a_1 p}^L = x_{a_1 p}^*$ for all $p \in LP_{a_1}$.

Step 204. For each $p \in LP_{a_1}$ and $a \in T_{a_1 p}$, fix $x_{ap}^L = x_{a_1 p}^L$ and update $c_a \leftarrow c_a - x_{ap}^L$.

Step 205. For each $p \in LP_{a_1}$.

(a) Let $a_{temp} = a_1$.

(b) If $a_{temp}$ is adjacent to the server that routes program p onto link $a_1$, go to Step (f).

(c) Let $a = pre_{a_{temp} p}$.

(d) If program p is requested at any of the nodes of $T_{ap} \setminus T_{a_1 p}$, go to Step (f); otherwise, fix $x_{ap}^L = x_{a_1 p}^L$ and update $c_a \leftarrow c_a - x_{ap}^L$.

(e) Let $a_{temp} = a$ and go to (b).

(f) Continue with next $p \in LP_{a_1}$.

Step 206 For each (a, p) that was fixed in Steps 203-205, delete (a, p) from LP and p from $LP_a$. Delete links whose set $LP_a = \emptyset$ from set A.

Step 207. Check if set A is empty or not. If $A = \emptyset$ (208), then STOP—Problem EBAM is solved (209). If $A \neq \emptyset$ (210), return to Step 201, where only problems in which $LP_a$ changed from the previous iteration and the new set $LP_a \neq \emptyset$ are re-solved.

Note that the algorithm would be essentially the same even without imposing the routing assumptions, except for somewhat more involved notations, as long as the routing of programs from servers to nodes is specified.

Let $|P|$ and $|A|$ be the number of programs and number of links in the network, respectively, and assume that all programs are carried on each of the links. Most of the computational effort in Algorithm EBAM is spent on computing the objective values $W_a$ in the first iteration. Thus, since solving for $W_a$ in Problem SLBAM-a for a single link at iteration 1 requires an effort of $O(|P|)$, the effort over all links is $O(|P|*|A|)$. The re-computation of $W_a$ for any link a at subsequent iterations of Algorithm EBAM can use as a starting point the corresponding value from the preceding iteration.

$V_a(i+1) \geq V_a(i)$ implies that optimal variable values may only increase in iteration i+1 and some of the variables whose optimal value was zero may become positive (but no positive variable will become zero). Thus, using the Activity Addition Algorithm for solving the single-link problems that need to be resolved at iterations i>1 keeps the total computational effort for computing the $W_a$'s over all iterations at $O(|P|*|A|)$. Note that the optimal decision variable values need to be computed at each link only when the corresponding link is selected as a bottleneck, at a total effort of $O(|P|*|A|)$. Although selecting a bottleneck link requires an effort of $O(|A|)$ per iteration at a total effort of $O(|A|^2)$, this effort is small relative to the effort spent on solving the single-link problems.

Algorithm EBAM is now illustrated by solving the example shown in FIG. 1. All link capacities are assumed to be 100 Mb/s. The following performance functions are assumed for all doubletons $(n, p) \in NP$: $F_{n1}(x_{a1})=x_{a1}$, $F_{n2}(x_{a2})=2x_{a2}$, $F_{n3}(x_{a3})=2x_{a3}$, $F_{n4}(x_{a4})=x_{a4}$, $F_{n5}(x_{a5})=x_{a5}$, and $F_{n6}(x_{a6})=x_{a6}$. The lower bounds are: $B_1=B_3=B_4=B_5=0$, $B_2=20$ and $B_6=40$. All lower bounds are converted to zero through transformation of variables $(x_{ap} \leftarrow x_{ap}-B_p)$ which changes the performance functions of program 2 to $F_{n2}(x_{a2})=40+2x_{a2}$ and of program 6 to $F_{n6}(x_{a6})=40+x_{a6}$. Also, some of the link capacities are reduced by this transformation, resulting in, $c_4=c_9=100$, $c_1=c_2=c_3=c_7=c_8=c_{10}=80$, $c_5=c_6=c_{11}=c_{13}=60$, and $c_{12}=40$.

Table 2 presents the results of the optimal objective function value $V_a$ for Problem SLBAM-a for each of the links 1-13 in each of the iteration of Algorithm EBAM. Each column of Table 2 corresponds to a link and each row corresponds to an iteration. The first row of Table 2 identifies link 12 as the bottleneck link with an objective value of 13.33 (the underlined bold entry in iteration 1). Table 3 provides the decision variables that are fixed at their lexicographic optimal value in each of the iterations. Thus, at the first iteration, all variables that use bottleneck link 12 are fixed, namely, $x_{12,1}^L=x_{12,4}^L=x_{12,5}^L=13.33$ and $x_{12,2}^L=x_{12,6}^L=0$. In addition, by Part (iii) of Proposition 1, $x_{32}^L=0$ (first row of Table 3).

Proceeding to iteration 2 in Table 2, Problem SLBAM-a needs to be resolved only for link 3 (link 12 is excluded from the problem). The objective value $V_3$ increases from 50 in the first iteration to 53.3 in the second iteration. The new bottleneck link is link 11 with $V_{11}=24$. The fixed variables are $x_{11,1}^L=x_{11,5}^L=24$, $x_{11,3}^L=12$, $x_{11,6}^L=0$, and by Part (iii) of Proposition 1, $x_{23}^L=12$. Thus, in iteration 3 only Problem SLBAM-2 is resolved.

TABLE 2

Iterations of Algorithm EBAM

| Iter | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 32 | 50 | 50 | 100 | 30 | 30 | 40 | 50 | 50 | 26.67 | 24 | 13.33 | 50 |
| 2 | 32 | 50 | 53.33 | 100 | 30 | 30 | 40 | 50 | 50 | 26.67 | 24 | | 50 |
| 3 | 32 | 58.67 | 53.33 | 100 | 30 | 30 | 40 | 50 | 50 | 26.67 | | | 50 |
| 4 | 32 | 122.67 | 53.33 | 100 | 30 | 30 | 40 | 50 | 50 | | | | 50 |
| 5 | 32 | 122.67 | 53.33 | 100 | | 30 | 40 | 50 | — | | | | 50 |
| 6 | 32 | 122.67 | 53.33 | 100 | | | 40 | 50 | | | | | — |
| 7 | | 122.67 | 53.33 | 100 | | | — | 64 | | | | | |
| 8 | | 122.67 | | 100 | | | | 64 | | | | | |
| 9 | | 122.67 | | 100 | | | | | | | | | |
| 10 | | 122.67 | | | | | | | | | | | |

TABLE 3

Optimal Decision Variable Values

| Iter | Bottleneck Link | By Prop. 1 (ii) | By Prop. 1 (iii) |
|---|---|---|---|
| 1 | $x_{12,1}^L = x_{12,4}^L = x_{12,5}^L = 13.33, x_{12,2}^L = x_{12,6}^L = 0$ | | $x_{32}^L = 0$ |
| 2 | $x_{11,1}^L = x_{11,5}^L = 24, x_{11,3}^L = x_{11,6}^L = 0$ | | $x_{23}^L = 12$ |
| 3 | $x_{10,1}^L = x_{10,4}^L = x_{10,5}^L = 26.67, x_{10,2}^L = 0$ | | $x_{21}^L = 26.67$ |
| 4 | $x_{54}^L = x_{55}^L = 30, x_{56}^L = 0$ | $x_{94}^L = x_{95}^L = 30$ | |
| 5 | $x_{64}^L = x_{65}^L = 30, x_{66}^L = 0$ | $x_{13,4}^L = 30, x_{13,6}^L = 0$ | |
| 6 | $x_{11}^L = x_{14}^L = 32, x_{13}^L = 16, x_{12}^L = 0$ | $x_{71}^L = x_{74}^L = 32, x_{72}^L = 0$ | |
| | | $x_{83}^L = 16, x_{82}^L = 0$ | |
| 7 | $x_{31}^L = 53.33, x_{33}^L = 26.67$ | | |
| 8 | $x_{85}^L = 64$ | | |
| 9 | $x_{45}^L = 100$ | | |
| 10 | $x_{22}^L = 41.33$ | | |

Consider now iteration 4 where link 5 is the bottleneck with $V_5=30$ and the variables using link 5 are fixed at $x_{54}^L=x_{55}^L=30$ and $x_{56}^L=0$. By Part (ii) of Proposition 1 variables on link 9 are also fixed at $x_{94}^L=x_{95}^L=30$. Thus, in order to satisfy the ordering constraints, link 5 starves link 9. All decision variables on link 9 are now fixed so that link 9 is not considered in subsequent iterations. The algorithm terminates after 10 iterations. Starved links (links 7, 9 and 13) have unused bandwidth capacity. In this example, links 7, 9 and 13 are left with 16, 40 and 30 unused Mbs, respectively.

The lexicographic optimal vector $F^{(NP)}(x^L)$ consists of the performance function values of the optimal decision variables sorted in non-decreasing order. This vector is readily derived from Tables 2 and 3. For instance, the largest 7 values of $F^{(NP)}(x^L)$ are associated with variables fixed at the first two iterations at a positive value; specifically, these values are 13.33, 13.33, 13.33, 24, 24, 24, 24 associated with variables (12, 1), (12.4), (12.5), (2, 3), (11, 1), (11, 3), (11, 5), respectively. Performance functions of variables fixed at zero at iterations 1 and 2 (variables (3, 2), (12, 6) and (11, 6) will be lower in $F^{(NP)}(x^L)$ since their performance function value is 40.

Note that the order of bottleneck links in Table 2 provides guidelines for capacity expansion decisions. Obviously, the most pressing expansion needs are at link 12, followed by links 11 and 10. Algorithm EBAM can also be used to experiment where programs should be stored. For instance, it may be desired to test whether serving program 4 only from server 1 or only from server 2 would lead to a better solution than that of the current configuration.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a method for equitable bandwidth allocation for content distribution networks, it will be apparent to those skilled in the art that modifications and variations are possible without deviating from the principles and broad teachings of the present invention which shall be limited solely by the scope of the claims appended hereto.

What is claimed is:

1. A method for determining bandwidth allocations among a plurality of programs on each link of a content distribution network comprised of multiple trees, comprising the steps of:
   broadcasting a plurality of programs from the root node of each of the trees along a path comprising a plurality of links connecting nodes through the corresponding tree to at least one destination node; and
   allocating bandwidth for each program of said plurality of programs carried on a link having an available bandwidth capacity such that the sum of the allocated bandwidths of all of the programs carried on the link does not exceed the available bandwidth capacity of the link;
   where the allocated bandwidth for each program carried on a link cannot be below a specified lower bound and the allocated bandwidth for each program can be decreased but not increased from one link to the next link along a path from the corresponding root node of the tree that broadcasts the program to at least one destination node; and
   assigning a performance function to each program requested at a node where the performance function is the same at all nodes that request the same program and is strictly increasing with the incoming bandwidth for the program at the node; and
   computing equitable bandwidth allocations among all programs carried on each of the links, where the equitable bandwidth allocations result in the performance function values for each program requested at a node and the lexicographic largest vector of performance function values where the performance function values are sorted in non-decreasing order.

2. The method as set forth in claim 1, wherein said computing equitable bandwidth allocations is performed by solving Problem EBAM.

3. The method as set forth in claim 2, wherein said computing equitable bandwidth allocations is performed by using Algorithm EBAM.

4. The method as set forth in claim 3, wherein said computing equitable bandwidth allocations is in polynomial computational effort for a wide class of performance functions that solve single-link problems specified by Problem SLBAM-a in polynomial computational effort.

5. The method as set forth in claim 4, wherein said computing equitable bandwidth allocations is in polynomial computational effort for any performance function that provides a closed-form expression for the unknown variable W in the equation $E_{p \in J} F_p^{-1}(W)=c$, where p is an index for variables, J is a set of variables, $F_p^{-1(W)}$ is the inverse of the performance function for variable p, and c is a parameter.

6. The method as set forth in claim 3, further comprising determining an ordered list of links from the most critical link to the least critical link.

7. A program storage device, readable by machine, tangibly embodying a program of instructions executable by the machine to cause the machine to perform a method for determining equitable bandwidth allocations among a plurality of programs on each link of a content distribution network comprised of multiple trees, comprising the steps of:
   broadcasting a plurality of programs from the root node of each of the trees along a path comprising a plurality of links connecting nodes through the corresponding tree to at least one destination node; and
   allocating bandwidth for each program of said plurality of programs carried on a link having an available bandwidth capacity such that the sum of the allocated bandwidths of all of the programs carried on the link does not exceed the available bandwidth capacity of the link;

where the allocated bandwidth for each program carried on a link cannot be below a specified lower bound and the allocated bandwidth for each program can be decreased but not increased from one link to the next link along a path from the corresponding root node of the tree that broadcasts the program to at least one destination node; and assigning a performance function to each program requested at a node where the performance function is the same at all nodes that request the same program and is strictly increasing with the incoming bandwidth for said program at said node; and computing equitable bandwidth allocations among all programs carried on each of the links, where the equitable bandwidth allocations result in the performance function values for each program requested at a node and the lexicographic largest vector of performance function values where the performance function values are sorted in non-decreasing order.

8. The program storage device as set forth in claim 7, wherein said computing equitable bandwidth allocations is performed by solving Problem EBAM.

9. The program storage device as set forth in claim 8, wherein said computing equitable bandwidth allocations is performed by using Algorithm EBAM.

10. The program storage device as set forth in claim 9, wherein said computing equitable bandwidth allocations is in polynomial computational effort for a wide class of performance functions that solve single-link problems specified by Problem SLBAM-a in polynomial computational effort.

11. The program storage device as set forth in claim 9, further comprising determining an ordered list of links from the most critical link to the least critical link.

12. The program storage device as set forth in claim 10, wherein said computing equitable bandwidth allocations is in polynomial computational effort for a wide class of performance functions that provides a closed-form expression for the unknown variable W in the equation $\Sigma_{p \in J} F_p^{-1}(W) = c$, where p is an index for variables, J is a set of variables, $F_p^{-1}(W)$ is the inverse of the performance function for variable p, and c is a parameter.

* * * * *

UNITED STATES PATENT AND TRADEMARK OFFICE
CERTIFICATE OF CORRECTION

| | | |
|---|---|---|
| PATENT NO. | : 7,801,177 B2 | Page 1 of 1 |
| APPLICATION NO. | : 12/036346 | |
| DATED | : September 21, 2010 | |
| INVENTOR(S) | : Luss | |

It is certified that error appears in the above-identified patent and that said Letters Patent is hereby corrected as shown below:

In the Specification

In Column 4, Line 66, delete "server." and insert -- server s. --, therefor.

In Column 5, Line 46, delete "(n, p) (n, p)∈" and insert -- (n, p); (n, p)∈ --, therefor.

Signed and Sealed this
Second Day of December, 2014

Michelle K. Lee
*Deputy Director of the United States Patent and Trademark Office*